United States Patent [19]

Edelmann et al.

[11] Patent Number: 5,545,253
[45] Date of Patent: Aug. 13, 1996

[54] BINDER FOR STORABLE COATING COMPOSITIONS

[75] Inventors: Roland Edelmann, Niederkassel; Friedhelm Schnippering, Siegburg; Christine Fliedner, Bonn; Reinhard Matthes, Bergisch Gladbach, all of Germany

[73] Assignee: Hüls Aktiengesellschaft, Marl, Germany

[21] Appl. No.: 401,636

[22] Filed: Jan. 26, 1995

[30] Foreign Application Priority Data

Feb. 10, 1994 [DE] Germany ............... 44 04 090.3

[51] Int. Cl.⁶ ................................................. C09D 5/10
[52] U.S. Cl. ................. 106/122; 106/287.16; 106/285
[58] Field of Search ................... 106/1.22, 287.16, 106/285

[56] References Cited

U.S. PATENT DOCUMENTS 3,859,101  7/1975  Slater .................................... 106/1

*Primary Examiner*—David Brunsman
*Attorney, Agent, or Firm*—Felfe & Lynch

[57] ABSTRACT

A binder composition for storable zinc dust paints contains a mixture of silicic acid esters, solvents, curing agents, an antideposition agent, and a dearomatized aliphatic hydrocarbon mixture with an average molecular weight of 133. The binder composition has a flash point distinctly higher than 21° C.

3 Claims, No Drawings

BINDER FOR STORABLE COATING COMPOSITIONS

FIELD OF THE INVENTION

The present invention relates to novel binders for storable coating compositions based on a mixture of silicic acid esters, solvents, curing agents and an antideposition agent, said mixture having a flash point distinctly higher than 21° C.

BACKGROUND OF THE INVENTION

Binders for solid particles based on hydrolyzates of silicic acid esters or silica gels are known to be useful as binders in the paint industry. The pigmentation of such binders with zinc dust, for example, produces paints which are known in the art as zinc dust paints or zinc-rich paints; they are used for providing metals, especially iron and steel, with corrosion-resistant coatings. The cured coatings are characterized by a high degree of surface hardness, and therefore excellent abrasion resistance, as well as by good solvent and temperature resistance and electrical conductivity.

The development of zinc dust paints based on silica gels began with two-component systems, where, in the simplest case, one component is a hydrolyzate of ethyl silicate in alcoholic solution as a binder, and the other is zinc dust. The two components are not mixed until just prior to application of the composition to the substrates, since the coating composition solidifies within a few hours after the zinc dust is added (See U.S. Pat. No. 3,056,684).

The subsequent developments made use of the effect of various additives upon the workability and quality of the paints, for examples by the addition of polyvinylbutyral (U.S. Pat. No. 3,392,130), boric acid esters (U.S. Pat. No. 3,392,036), alkyl titanates (U.S. Pat. Nos. 3,442,824 and 3,546,155) or trialkyl phosphates (German Patent No. 2,000,199). To raise the flash point of the binders, ethyl silicate was transesterified with higher alcohols (U.S. Pat. No. 3,730,743). However, two-component zinc dust paints have a number of disadvantages as regards their use. Because of the necessity of storing the binder and zinc dust separately, there are disadvantages with respect to stockkeeping. Once made up, the mixtures must be processed immediately and completely within a few hours. Moreover, the aging of the hydrolyzate during storage results in changes of important performance parameters, such as processing properties (for instance, viscosity) and reactivity (effect of curing rate), so that considerable problems arise when zinc dust paints are applied which contain binders of different degrees of aging.

Because of the above-mentioned disadvantages of two-component systems, the so-called one-component systems were developed during the ensuing years. These improved systems were intended to bring about improvements, especially with respect to the stability of the mixture of binder, pigments, and fillers in the paint container. Because of the high density of the zinc dust and the low viscosity of the alkyl silicate, the zinc dust settled on the bottom during storage in closed containers in such a way that it was no longer possible or possible only with great difficulty to redisperse the precipitate by stirring. The use of specific rheological additives, such as Bentones® or pyrogenic silicic acid, made it possible to produce single-component zinc dust paints which can be used without difficulty even after several months of storage. These formulations contain unhydrolyzed silicic acid esters and react only under the action of atmospheric moisture, by hydrolysis and condensation, to give an increasingly crosslinked $SiO_2$-gel (See U.S. Pat. No. 3,859,101 and German Patent No. 2,654,036). The hydrolysis and condensation process is catalyzed by alkaline substances such as amines or alcoholates.

Because of the use of alcohols, ketones, ethers and alkyl esters of lower carboxylic acids, or mixtures thereof as solvents, the known binders have a flash point which is often less than 21° C. Since small quantities of alcohol are released due to hydrolysis when the zinc dust paint is applied, it is difficult for binders based on ethyl silicate to attain a flash point higher than 21° C. This is also true if solvents or solvent mixtures are employed which originally have a flash point substantially higher than 21° C. When xylene is used as the solvent, the flash point of the binder is 23° C. (See European Patent No. 0,039,008). When propyl or butyl silicates are used, the systems obtained thereby also have relatively high flash points. In both instances, however, because of the relatively slow evaporation of the solvent (xylene or the alcohols formed) and because of the modified hydrolysis characteristics of the esterified silicic acid groups, the initial curing of the paint is delayed.

OBJECTS OF THE INVENTION

It is an object of the present invention to provide binders for storable coating compositions based on a mixture of silicic acid esters, solvents, curing agents and an antideposition agent, having a flash point higher than 21° C.

Another object of the present invention, is to provide binders for storable coating compositions based on a mixture of silicic acid esters, solvents, curing agents and an antideposition agent which do not have the disadvantages heretofore mentioned.

Other objects and advantages of the present invention will become apparent as the description thereof proceeds.

DESCRIPTION OF THE INVENTION

U.S. Pat. No. 5,384,350, discloses binder compositions which, because of their content of n-butyl acetate, have a flash point slightly higher than 21° C. We have discovered that by using a dearomatized aliphatic hydrocarbon mixture having an average molecular weight of 133, which is commercially available under the tradename Exxsol D 30, in place of n-butyl acetate, it is possible to obtain a binder mixture the flash point of which is distinctly higher than 21° C. and is retained even after storage over a period of more than six months at a temperature of 50° C. The binder composition according to the present invention is characterized by good rheological properties. The rheologically active antideposition agent is readily soluble in the solvents which are used in accordance with the present invention. The binder composition according to the present invention is useful as a component for the preparation of coating compositions. Together with zinc dust or zinc dust mixtures, the binder forms coating compositions which are known by the name of zinc dust paint or zinc-rich paint. However, other conventional inorganic pigments or fillers such as iron oxide, chromium oxide, titanium dioxide, micaceous iron oxide, barium sulfate, kaolin, talc, mica, or mullite, are also compatible with the binder composition of the instant invention. All of the paints which incorporate a binder composition according to the present invention can be stored in closed containers for relatively long periods of time without undergoing any detrimental changes. The pigments or pigment mixtures which may deposit on the bottom of the container during storage may easily be redispersed by stirring to give a uniform suspension. Within the usual processing period, the pigments do not deposit; in other words, additional stirring is not necessary. The paints formulated with the aid of the binders according to the present invention can readily be applied in conventional manner, for instance, by spraying or brushing, and give rapidly curing (drying) coatings which provide outstanding protection against corrosion. The hardness of the coatings measured by the Erichsen scale is more than 150 after four hours and 200–250 after six hours. Furthermore, the paints formulated with the aid of the binder compositions of the instant invention are compatible with a wide range of topcoats based on organic resins.

The silicic acid esters employed in the binder compositions according to the present invention are monomeric silicic acid esters or oligomeric silicic acid esters of 2 to 10 Si atoms. The monomeric silicic acid esters have the empirical formula $Si(OR')_4$, where R' is alkyl of 2 to 4 carbon atoms. The silicic acid esters are present in the binder composition according to the present invention in unhydrolyzed form. Preferred silicic acid esters are oligomeric ethyl silicates with an $SiO_2$ content of 18 to 50% by weight, preferably 24 to 40% by weight.

The preferred solvents employed for the binder compositions of the present invention are aliphatic and aromatic hydrocarbons. Each binder composition contains the mixture of dearomatized aliphatic hydrocarbons with an average molecular weight of 133 (commercially available as Exxsol D 30). The solvent may be exclusively Exxsol D 30. The content of Exxsol D 30 is preferably 6 to 60% by weight, based on the total weight of the binder composition. The solvents mentioned above are preferably added to the silicic acid ester as a solvent mixture. Particular preference is given to a mixture of Exxsol D 30 and aromatic solvents, the latter being commercially available under the name Solvesso 100, in a weight ratio of 1:6 to 6:1. This weight ratio is 1:3 to 3:1 in a further preferred embodiment of the present invention. The solvent content of the binder composition according to the present invention is preferably 40 to 70% by weight, based on the total weight of the binder composition.

Antideposition agents which have been shown to be rheologically effective in the binder compositions according to the present invention are styrene copolymers. Among these, styrene-acrylate copolymers or polymers based on methacrylic acid esters or on isobutyl methacrylate are preferred. These polymers exhibit good solubility in the above-mentioned solvents and a high degree of compatibility with the other components of the zinc dust paints. The antideposition agent is added in amounts of about 1 to 20% by weight, based on the amount of silicic acid ester which is used. 8 to 15% by weight of antideposition agent is preferably added.

In order to accelerate the curing reaction, known catalysts may be added to the binder composition of the instant invention. Alkanolamines are particularly suitable as curing catalysts, for instance monoethanolamine, triethanolamine or propanolamine, or a tertiary amine such as that commercially available under the name of ANCHOR K 54. If desired, the catalysts are added in amounts of about 0.5 to 25% by weight, based on the amount of silicic acid ester which is used.

The following examples illustrate the present invention and will enable others skilled in the art to understand it more completely. It should be understood, however, that the invention is not limited solely to the particular examples given below.

EXAMPLE 1

448 parts by weight of ethyl silicate (commercially available as DYNASIL 40), 467 parts by weight of a mixture of aromatic compounds (commercially available under the name SOLVESSO 100), 180 parts by weight of a mixture of dearomatized aliphatic hydrocarbons having an average molecular weight of 133 (commercially available under the name EXXSOL D 30), 60 parts by weight of styrene-acrylate, and 45 parts by weight of a tertiary amine (commercially available under the name of ANCHOR K 54)

were thoroughly mixed with each other. 4800 parts by weight of paint-grade zinc dust were introduced into this binder composition. The zinc dust had an average particle size of 6 to 7 microns and contained minor amounts of mica, chromium oxide and talc amounting to a total of 5% by weight.

The resulting mixture was stored over a period of more than 6 months at temperatures as high as 50° C., without undergoing any changes in its useful properties.

A coat of this zinc dust paint applied to a substrate with a thickness of 60–70 microns was dust-dry after 20–30 minutes at a relative atmospheric humidity of 60% and a temperature of 20° C., and after 4 hours its reached a hardness of 150 measured by the Erichsen scale; after 6 hours of the coat of paint was 200, and after 1 day it was more than 500, both measured by the Erichsen scale.

The flash point of the binder composition was 30° C. determined in accordance with DIN 53213.

EXAMPLE 2 (COMPARATIVE EXAMPLE)

448 parts by weight of ethyl silicate (commercially available DYNASIL 40), 467 parts by weight of n-butyl acetate, 180 parts by weight of a mixture of aromatic compounds (commercially available under the name SOLVESSO 100), 60 parts by weight of styrene-acrylate, and 45 parts by weight of diisopropanolamine were thoroughly mixed with each other. 4800 parts by weight of paint-grade zinc dust of the same type and composition as that used in Example 1 were blended into this binder composition.

The resulting zinc dust paint composition was stored over a period of more than 6 months, and at the end of that time was found not to have undergone any alternation of its physical properties.

A coat of this zinc dust paint applied to a substrate with a thickness of 60–70 microns was dust-dry in 6–8 minutes at a relative atmospheric humidity of 60% and a temperature of 20° C., and after 2 hours its hardness was more than 150 as measured by the Erichsen scale. After 4 hours the hardness of the coat was 300, and after one day it was more than 500, both measured by the Erichsen scale.

The flash point of the finished binder composition was 23° C. determined in accordance with DIN 53213.

EXAMPLE 3

120 parts by weight of propyl silicate containing approximately 35 to 40% by weight of $SiO_2$, 107 parts by weight of a dearomatized aliphatic hydrocarbon mixture having an average molecular weight of 133 (commercially available under the name EXXSOL D 30), 46 parts by weight of a mixture of aromatic compounds (available under the name SOLVESSO 100), 15 parts by weight of styrene-acrylate, and 12 parts by weight of diisopropanolamine were mixed with each other. 1200 parts by weight of paint-grade zinc dust of the same nature and composition as that used in Example 1 were introduced and blended into the resulting binder composition.

The zinc dust paint mixture obtained thereby was stored over a period of more than 6 months without undergoing any change in its useful properties.

A coat of this zinc dust paint applied to a substrate with a thickness of 60–70 microns was dust dry in 20–30 minutes at a relative atmospheric humidity of 60% and a temperature of 20° C. After 4 hours, it reached a hardness of 100–150 measured by the Erichsen scale, after 6 hours the hardness was 150, and after one day it was 400–500 measured according to the Erichsen scale.

The flash point of the finished binder composition was 28° C., measured according to DIN 53213.

EXAMPLE 4 (COMPARATIVE EXAMPLE)

340 parts by weight of ethyl silicate (commercially available under the name DYNASIL 40), 300 parts by weight of ethylene glycol monoethyl ether, 10 parts by weight of polymeric butyl titanate, 230 parts by weight of a 25% solution of the terpolymer of ethyl acrylate, ethyl methacrylate and methyl methacrylate in methyl isobutyl ketone, 45 parts by weight of triethanolamine, 75 parts by weight of BENTONE PASTE 34=
  10 parts by weight of BENTONE®,
  10 parts by weight of an electrically neutral wetting suspension and dispersing agent (commercially available under the name ANTI-TERRA-U), and 80 parts by weight of petroleum ether 100/140 were mixed with each other. 4000 parts by weight of paint-grade zinc dust were blended into the resulting binder composition.

The zinc dust had an average particle size of 6–7 microns and contained a total of 5% by weight of mica, chromium oxide and talc additives.

The zinc dust paint thus obtained was stored over a period of more than 6 months without undergoing any alterations of its useful properties.

A coat of this zinc dust paint applied to a substrate with a thickness of 60–70 microns at a relative atmospheric humidity of 60% and at a temperature of 20° C. was dust-dry in 10 minutes and reached a hardness corresponding to an H pencil after 90 minutes. After 4 hours the coating had a hardness of 200 and after one day it had a hardness of 300, both values determined by the Erichsen scale.

The flash point of the binder composition was 10° C. as measured in accordance with DIN 53213.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:

1. In a binder composition for zinc dust paints, said binder composition comprising a silicic acid ester, curing agent and an antideposition agent, said binder composition having a flashpoint higher than 21° C., the improvement which resides in that said binder composition further contains 40–70% by weight, based on the total weight of said binder composition, of a mixture of aliphatic and aromatic solvents in a weight ratio of 1:6 to 6:1, and 6–60% by weight, based on the total weight of said binder composition, of a dearomatized aliphatic hydrocarbon mixture having an average molecular weight of 133.

2. A binder composition of claim 1, wherein the solvent is a mixture of aliphatic and aromatic solvents in a weight ratio of 1:3 to 3:1.

3. The method of preparing a zinc dust containing coating composition, which comprises adding to said coating composition a binder composition having a flashpoint higher than 21° C., said binder composition comprising a silicic acid ester, a curing agent, an antideposition agent, 6–60% by weight of a dearomatized aliphatic hydrocarbon mixture having an average molecular weight of 133, and 40–70% by weight of a mixture of aliphatic and aromatic solvents in a weight ratio of 1:6 to 6:1.

* * * * *